United States Patent [19]
Sanders et al.

[11] 3,727,710

[45] Apr. 17, 1973

[54] STEER CONTROL FOR A TRACK-LAYING VEHICLE

[75] Inventors: Robert K. Sanders, Whitestown; Jerry R. Marlow, Greenwood; Kenneth A. Dornfeld, Indianapolis, all of Ind.

[73] Assignee: General Motors Corporation, Detroit, Mich.

[22] Filed: May 13, 1971

[21] Appl. No.: 142,880

[52] U.S. Cl. ................................................180/6.7
[51] Int. Cl. .............................................B62d 11/08
[58] Field of Search ....................180/1 R, 6.2, 6.5, 180/6.7

[56] References Cited

UNITED STATES PATENTS 3,288,232  11/1966  Shepherd ..........................180/6.2 X
3,543,654  12/1970  Long et al. ........................180/6.5 X
3,620,319  11/1971  Armasow et al. .................180/6.7 X
2,930,257  3/1960   Christenson ......................74/720.5

Primary Examiner—Kenneth H. Betts
Assistant Examiner—Leslie J. Paperner
Attorney—Jean L. Carpenter, Paul Fitzpatrick and Warren D. Hill

[57] ABSTRACT

An electronic control circuit combined with an electro-hydraulic transducer regulates right and left steering clutches in a cross-drive transmission for a track-laying vehicle to effect steering by driving. The control inputs are steer lever position and track speeds so that a closed loop control is provided for controlling track speed differential as a function of actual relative track speeds.

5 Claims, 11 Drawing Figures

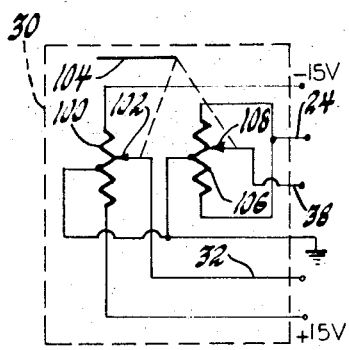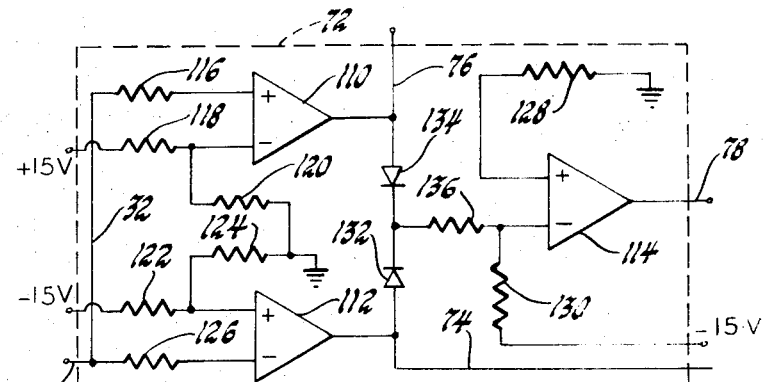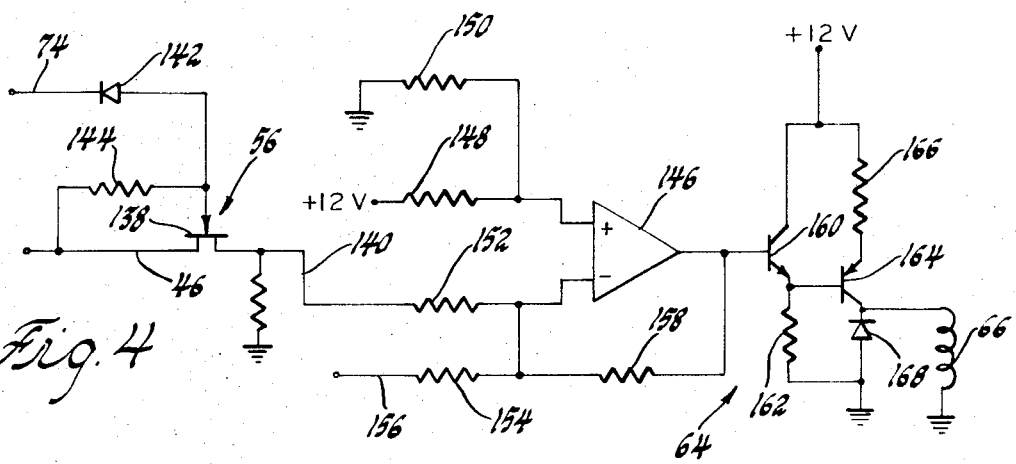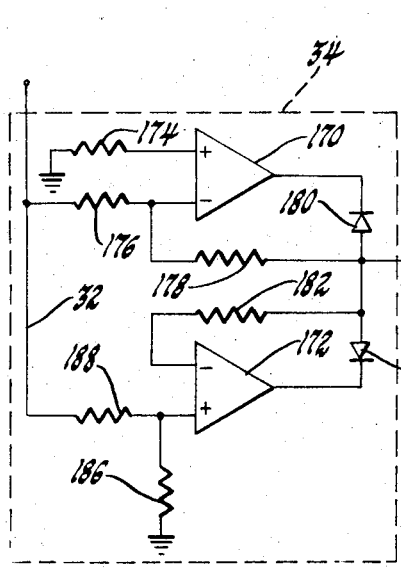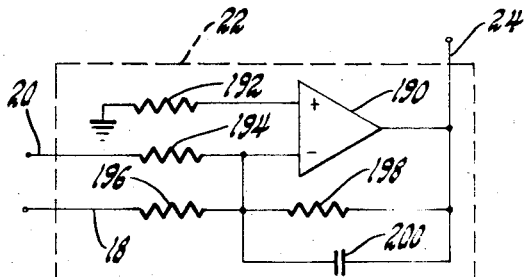

INVENTORS
Robert K. Sanders,
BY Jerry R. Marlow, &
Kenneth A. Dornfeld
Warren D. Hill
ATTORNEY

STEER CONTROL FOR A TRACK-LAYING VEHICLE

The invention herein described was made in the course of work under a contract or subcontract thereunder with the Department of Defense.

This invention relates to a steer control for a track-laying vehicle and particularly to a closed loop control having a track speed feedback.

It has been common practice to employ cross-drive transmissions in track-laying vehicles and to accomplish steering by driving by torque sensitive steer devices which include left and right steering clutches and/or brakes in the transmission to effect a differential track speed. The torque sensitive steer devices have many inherent variables which can cause instability of the control which must be overcome by the vehicle operator. The variables include such things as clutch capacity which is variable with speed differential across the clutch pack, the temperature and instant friction coefficient. Further, the return and exchange of track forces changes constantly with vehicle speed, type of terrain and the radius of turn.

It is therefore a general object of this invention to provide a closed loop steer control for a track-laying vehicle.

It is a further object of this invention to provide a steer control for a track-laying vehicle which employs a track speed feedback to the control.

It is another object to provide a steer control for a track-laying vehicle wherein the track speed differential is a function of manual steer input and the actual track speeds.

The invention is carried out by providing in a steer control for a track-laying vehicle, variable capacity torque transmitting devices for effecting a track speed differential, a steer selector, a track speed sensor and apparatus for regulating the torque capacity of the devices as a function of track speed and the desired turning rate to establish a track speed differential. The invention further comprehends pressure responsive devices for effecting track speed differential and an electronic control circuit for computing the pressures to be applied to the devices for establishing a desired track speed differential.

The above and other advantages will be made more apparent from the following specification taken in conjunction with the accompanying drawings wherein like reference numerals refer to like parts and wherein:

FIG. 2 is a schematic diagram of the steer lever transducer of FIG. 1;

FIG. 3 is a schematic diagram of the gate control and trigger circuit of FIG. 1;

FIG. 4 is a schematic diagram typifying the gate circuits and output driver of FIG. 1;

FIG. 5 is a schematic diagram of the steer amplifier of FIG. 1;

FIG. 6 is a schematic diagram of the average speed computer of FIG. 1;

The preferred embodiment of the control described herein is intended to apply to a cross-drive transmission of the type illustrated in the United States Patent to Christenson No. 2,930,257 which includes left and right steering clutches which are selectively actuated to provide steering in one direction or the other. Each steering clutch is normally disengaged for straight ahead driving and pressure is applied to the right steer clutch, for example, for a right turn and the pressure on the clutch is proportioned according to the degree of steering or the turning rate desired. The controlling clutch is connected through differential gearing to output shafts so as the right output shaft speed, for example, is retarded, the left output shaft will be increased in speed by a like amount to establish a track speed differential. The invention is not, however, limited to that particular arrangement, but rather is adaptable to other steering arrangements including variable torque capacity torque transmitting devices, i.e., brakes or clutches, for effecting track speed differential.

Figure 1:
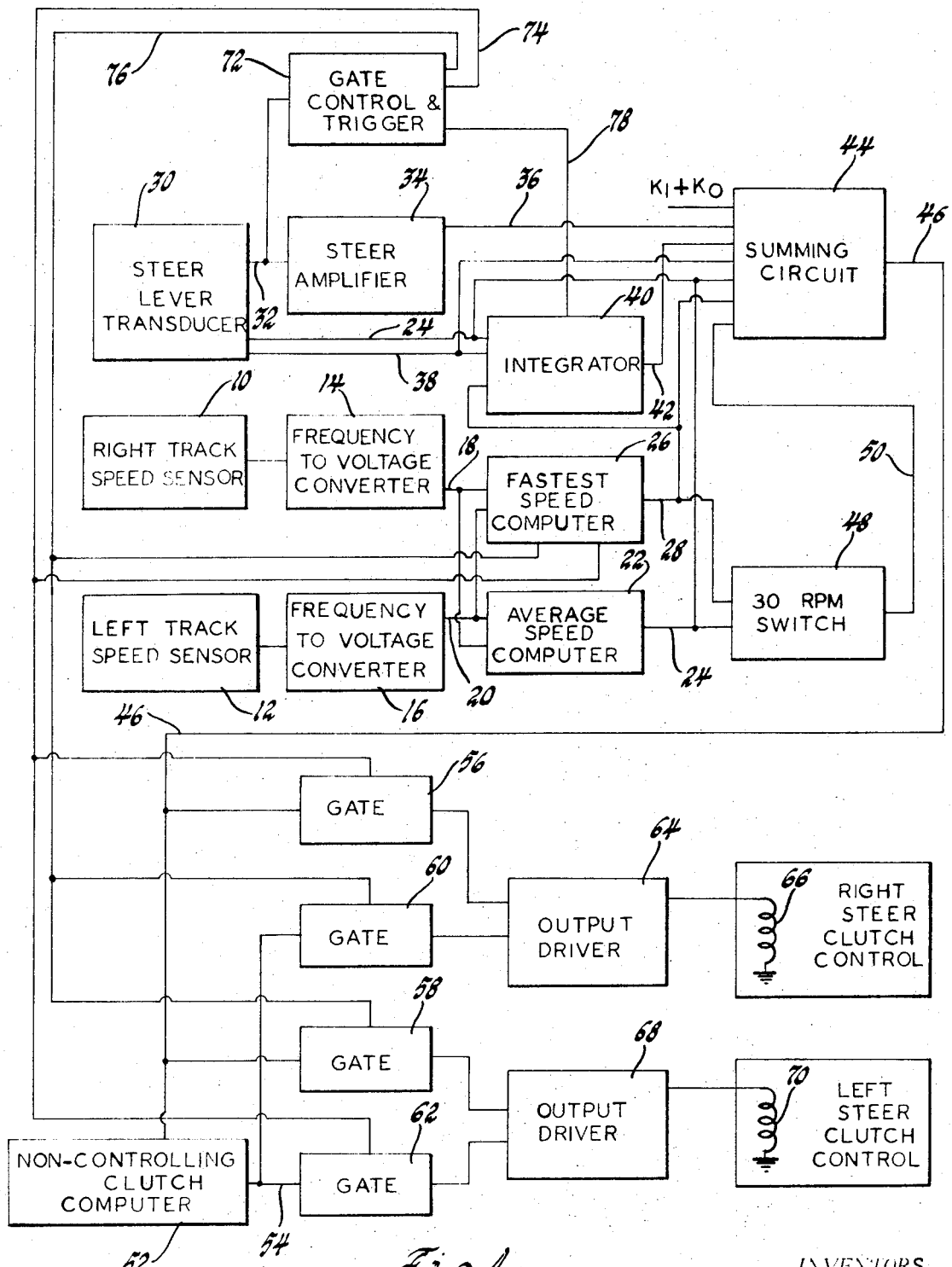
FIG. 1 is a block diagram of a steer control circuit according to the invention.

The control depicted in FIG. 1 is intended to control steering clutch pressure in such a manner that a desired track speed differential is accomplished and to that end, computes a pressure for the controlling clutch according to the following equation:

$$P_c = K_1 + 80L + K_2[N_aL - (N_f - N_a)]$$
$$+ K_3 \int [N_aL - (N_f - N_a)]dt$$

where
$K_1 = 40$ psi
$L =$ steer lever position (variable from 0 to 1)
$K_2 = 0.1$ psi/rpm
$N_a =$ average track speed
$N_f =$ fastest track speed
$K_3 = 1$ psi/sec/rpm
the $K_2$ term is limited to $\pm 20$ psi maximum and the $K_3$ term is negative only. The non-controlling clutch is subjected to a pressure according to the following equation:

$$P_{nc} = 10 \text{ psi} - P_c$$

where $P_{nc}$ is limited to a minimum of 10 psi. The equation for $P_c$ is designed to provide, initially, upon a steer request, a pressure equal to the $K_1$, $L$, and $K_2$ terms to approximate a pressure slightly greater than that required to achieve the desired steering rate. The expression $N_aL$ represents the requested turning rate while the expression $N_f - N_a$ represents the actual turning rate or track speed differential. The $K_2$ term then represents a pressure corresponding to the difference between the desired rate and the actual rate which may be termed "steer error." That term then tends to modulate the pressure to eliminate steer error. The $K_3$ term represents the integral of steer error and slowly but accurately provides a fine pressure control to eliminate the steer error. The equation for $P_{nc}$ provides a minimum pressure on the non-controlling clutch to keep the fluid motor of the non-controlling clutch filled during a turning maneuver. For example, during a right turn the left steer clutch will be maintained filled and is therefore kept in readiness for rapid response should a left steer be required. In the event the vehicle enters a skid condition the term $P_c$ becomes negative. The right steer clutch of course cannot have a negative pressure but the pressure on the left steer clutch increases to reverse the sense of the track speed differential, as if for a left steer, so that the skid condition is automatically corrected. This correction will occur even if the steer position lever is held in the right steer position.

Referring to FIG. 1, right and left track speed sensors 10 and 12 detect the rotational speed of the right and left output shafts respectively of the cross-drive transmission. These sensors are preferably of the well-known toothed wheel variable reluctance electromagnetic transducer type. The sensor outputs are fed to frequency-to-voltage converters 14 and 16 which produce on lines 18 and 20 DC analog signals proportional to right and left track speeds respectively. Both speed signals are fed to an average speed computer 22 which produces on line 24 a DC signal $-N_a$ proportional to the negative value of the average track speeds. The speed signals are also fed to a fastest speed computer 26 which produces on line 28 an analog signal proportional to the fastest track speed $N_f$. A steer lever transducer 30 is controlled by a manually operated steer lever or steering wheel and produces on line 32 a DC signal having a magnitude and polarity depending upon the amount and direction of the requested steer respectively. That signal is fed to a steer amplifier 34 which produces on output line 36 a positive signal L proportional to the degree of steering or turning rate requested. The line 24 carrying the signal $-N_a$ is connected as an input to the steer lever transducer which multiplies that signal according to the steer lever position to produce on line 38 a signal $-N_aL$.

An integrator 40 has as inputs the signals on lines 24, 28 and 38 and produces an output on line 42 proportional to $$K_3 \int [N_aL - (N_f - N_a)] dt.$$

A summing circuit 44 includes as inputs the signals on lines 24, 28, 36, 38 and 42 and a signal proportional to $K_1 + K_0$ where $K_0$ is an offset voltage for a purpose to be described. These inputs are appropriately added or subtracted to produce on line 46 an output signal proportional to $P_c + K_0$. A 30 rpm switch 48 has lines 24 and 28 as inputs and produces on its output line 50 a voltage signal equivalent to 40 psi whenever $N_f - N_a$ exceeds 30 rpm. The line 50 is connected as an input to the summing circuit 44 to subtract 40 psi from the pressure $P_c$ whenever the 30 rpm switch is activated, thereby preventing an excessive turning rate.

A non-controlling clutch computer 52 has as its input the signal $P_c + K_0$ on the line 46 and produces on line 54 an output signal $P_{nc} + K_0$. A series of gates includes gates 56 and 58 having the line 46 as inputs and gates 60 and 62 having the line 54 as inputs. The outputs of the gates 56 and 60 are connected to an output driver 64 which energizes a solenoid 66 in the right steer clutch control. Similarly, the outputs of the gates 58 and 62 are connected to an output driver 68 which energizes a solenoid 70 in the left steer clutch control. The solenoids operate hydraulic valves to provide a pressure according to solenoid current as more fully described in the United States Patent to Schaeffer No. 3,225,619. The electrically modulated pressure is then applied to a steer clutch to control the torque capacity thereof. A minimum solenoid current is required to initiate a clutch pressure. The offset voltage $K_0$ is provided to afford that minimum current. Any additional solenoid current as a result of the signal $P_c$ provides a clutch pressure proportional to $P_c$.

A gate control and trigger circuit 72 has its input connected to line 32. An output line 74 is connected to gates 56 and 62 and a second output line 76 is connected to gates 60 and 58. Normally the signals on the lines 74 and 76 are such that the gates will be disabled and the solenoids will be deenergized. When, however, the steer lever is moved from its neutral position to indicate a desired steer direction, one of the lines 74 or 76 will be energized to enable its respective gates. For example, when a right turn is indicated, the line 74 will be deenergized to enable gates 56 and 62 so that the signal $P_c + K_0$ will be passed to the output driver 64 and the right steer clutch will be controlled according to the pressure $P_c$. Similarly, the signal corresponding to the pressure $P_{nc} + K_0$ will pass gate 62 to effect a low pressure application to the left steer clutch except during a skid condition when the left clutch pressure becomes high. Conversely, when a left steer is selected the line 76 will be energized to energize the steer clutches in the opposite manner. The gate control and trigger circuit 72 has a third output 78 which is energized when steering is requested. Line 78 is connected to the integrator 40 and serves to render the integrator inoperative until steering is requested, whereupon integration is allowed to occur.

FIG. 2 depicts the steer lever transducer 30. A potentiometer 100 is connected between $-15v$ and $+15v$ and has a grounded center tap. A slide tap 102 controlled by steer lever 104 is connected to the line 32 to provide on line 32 a signal corresponding in polarity and magnitude to the direction and degree of turning requested by the steer lever position. A second potentiometer 106 has both ends connected to line 24 carrying the signal $-N_a$ and has a grounded center tap. The slide tap 108 controlled by the steer lever 104 is connected to line 38 to provide the signal $-N_aL$ which is the product of the average track speed and the relative lever position.

FIG. 3 depicts the gate control and trigger 72 which comprises an array of operational amplifiers 110, 112 and 114 each arranged as a trigger circuit. The amplifier 110 has its positive input connected through an input resistor 116 to the line 32 and its negative input is connected through resistors 118 and 120 to $+15v$ and ground respectively. The amplifier output is connected to line 76. The amplifier 112 has its positive input connected through input resistors 122 and 124 to $-15v$ and ground respectively and its negative input is connected through input resistor 126 to line 32. The output is connected to line 74. For a neutral steer position, the line 32 will be at ground potential and both amplifiers 110 and 112 will have a negative output. The components are so selected that a lever movement of less than 1° in either direction will activate neither trigger circuit, thereby providing a neutral deadband. A larger lever movement will cause either amplifier 110 or 112, depending on the polarity of line 32, to trigger to impress a positive voltage on its output. Thus, for a right steer request, the line 74 will become positive and for a left steer request, the line 76 will become positive to enable the corresponding gate circuits.

The amplifier 114 has its positive terminal connected to ground through resistor 128 and the negative terminal is connected to −15v through resistor 130. The lines 74 and 76 are connected through diodes 132 and 134 respectively and through an input resistor 136 to the negative input terminal. Thus, when the lines 76 and 74 are each at a negative voltage, the amplifier output on line 78 will be positive. When, however, either of the lines 74 or 76 becomes positive, the amplifier 114 will switch to a negative output to trigger the integrator 40.

FIG. 4 depicts a gate circuit and output amplifier and a solenoid which are representative of all the gate circuits and both output drivers. The gate circuit 56 comprises a field effect transistor (FET) 138 having its source and drain electrodes connected to lines 46 and 140 respectively and its gate electrode connected through a diode 142 to line 74. The gate electrode is also connected through a resistor 144 to the line 46. The FET will be conductive except when a large negative voltage is applied to its base. Since the line 74 is normally negative, the FET will normally be turned off. When, however, the line 74 becomes positive, the negative gate potential is removed and the FET conducts so that the signal $P_c + K_0$ on line 46 is passed to the line 140.

The output driver 64 includes an operational amplifier 146 connected as an inverting amplifier and has its positive terminal connected through resistors 148 and 150 to +12v and ground respectively while its negative input terminal is connected through input resistors 152 and 154 to the line 140 and to the line 156 which is the input from the gate 60. The negative input terminal is also connected to a feedback resistor 158. The output of the amplifier 146 then will be $12v - P_c - K_0$ assuming that the gate 56 is conducting.

A power amplifier comprises a transistor 160 having its collector connected to +12v and its emitter connected through resistor 162 to ground. The emitter is also connected to the base of a power transistor 164 having its emitter connected through a power resistor 166 to +12v and the collector is connected to the solenoid 66. A spike suppressing diode 168 is connected between ground and the collector of the transistor 164. When 12v is applied to the base of the transistor 160, it will conduct to maintain the power transistor 164 turned off. When, however the 12v input signal is reduced by the $P_c + K_0$ signal, the transistor 160 will become less conductive and the transistor 164 will conduct according to the value of $P_c + K_0$ to energize the solenoid 66 accordingly.

FIG. 5 shows the steer amplifier 34 which includes a pair of operational amplifiers 170 and 172 connected as inverting amplifiers. The amplifier 170 has its positive input terminal grounded through a resistor 174 and its negative terminal connected to line 32 through input resistor 176. The negative terminal is connected through a feedback resistor 178 to the output line 36 and through a diode 180 to the amplifier output. The amplifier 172 has its negative terminal connected through a feedback resistor 182 to line 36 and through a diode 184 to the amplifier output. The positive input terminal is connected through resistors 186 and 188 to ground and line 32 respectively. When the line 32 goes positive, the amplifier 170 produces a proportionate negative output which is applied through the diode 180 to line 36. When line 32 goes negative, the amplifier 172 produces a negative output which is applied to line 36 through the diode 184. The signal on line 36 accordingly, corresponds to $-L$.

FIG. 6 shows the average speed computer 22 which includes an operational amplifier 190 connected as an inverting amplifier and has its positive input terminal connected through a resistor 192 to ground and its negative input terminal connected through resistors 194 and 196 to lines 20 and 18 respectively which carry positive signals corresponding to left and right track speeds. The negative input of the amplifier is connected through a feedback resistor 198 to the amplifier output. A filtering capacitor 200 is placed in parallel with the resistor 198 to eliminate ripple. The resistors are chosen to provide an amplifier gain of ½ so that the output signal on line 24 will be $-N_a$ which is the negative average of the track speeds.

Figure 7:
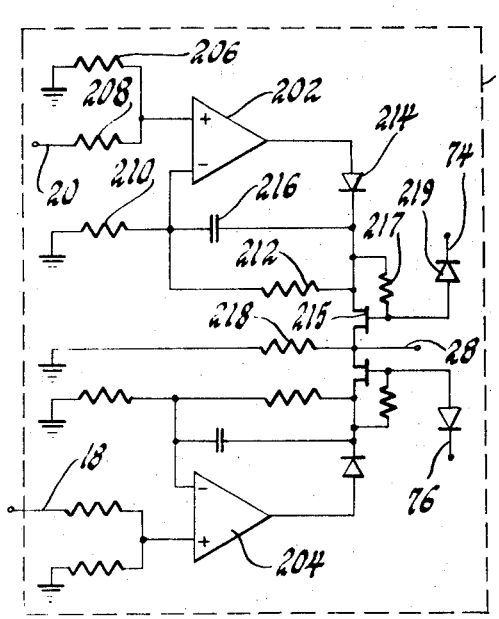
FIG. 7 is a schematic diagram of the fastest speed computer of FIG. 1.

The fastest speed computer 26 is shown in FIG. 7 and comprises a pair of operational amplifiers 202 and 204 connected as non-inverting amplifiers. The positive input of the amplifier 202 is connected through resistors 206 and 208 to ground and line 20 respectively. The negative input is connected to ground through a resistor 210 and is connected through a resistor 212 and a diode 214 to the amplifier output. A capacitor 216 is in parallel with the feedback resistor 212 to eliminate ripple. The junction of the diode 214 and the resistor 212 is connected through an FET 215 to an output line 28 which is connected to ground through a resistor 218. The gate electrode of the FET 215 is connected through a resistor 217 to the cathode of the diode 214 and is further connected through a diode 219 to the line 74. The FET operates the same as the FET in the gate circuit of FIG. 4 and is arranged to conduct only when the line 74 is positive, i.e., when a right steer is requested, to transmit the left track speed signal to line 28. The amplifier 204 is arranged in exactly the same manner except that its input is connected to the line 18, and the gate of the corresponding FET is connected to the line 76. The output line 28 therefore will carry a voltage corresponding to the left or right track speed, whichever should normally be higher for the requested steer direction, and is termed the signal $N_f$.

Figure 8:
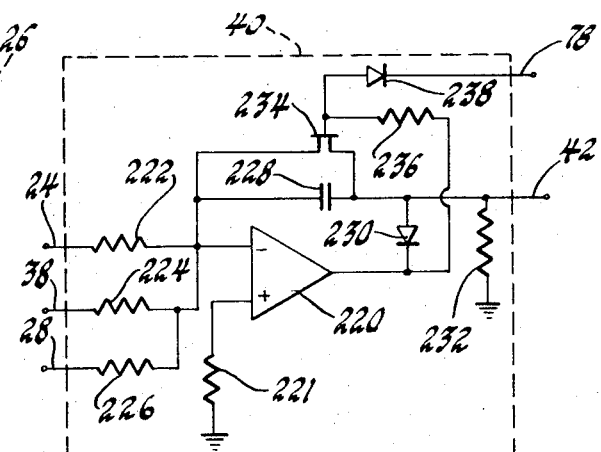
FIG. 8 is a schematic diagram of the integrator of FIG. 1.

FIG. 8 depicts the integrator 40 which includes an operational amplifier 220 having its positive input connected to ground through resistor 221 and its negative input connected through resistors 222, 224 and 226 to the lines 24, 38 and 28 respectively. The negative input is also connected through an integrating capacitor 228 and a diode 230 to the amplifier output. The output line 42 is connected at the junction of the diode and capacitor and is connected to ground through a resistor 232. An FET 234 is connected across the capacitor 228 and has its gate connected through a resistor 236 to the amplifier output. The gate is also connected through a diode 238 to line 78 which carries a trigger voltage from the gate control and trigger circuit 72. During a neutral position of the steer lever, the line 78 is positive so that the FET gate is conducting and the integrator output is held at zero potential. When the steer lever is moved to a steer condition, the line 78 goes negative to turn off the FET so that the integration will begin. Since the integrator inputs are $-N_a$, $-N_aL$ and $+N_f$, the integrator output will be $$K_3 \int [N_aL - (N_f - N_a)]dt,$$

the $K_3$ factor being derived from the integrator gain. Due to the polarity of the diode 230, only a negative integrator output is permitted.

Figure 9:
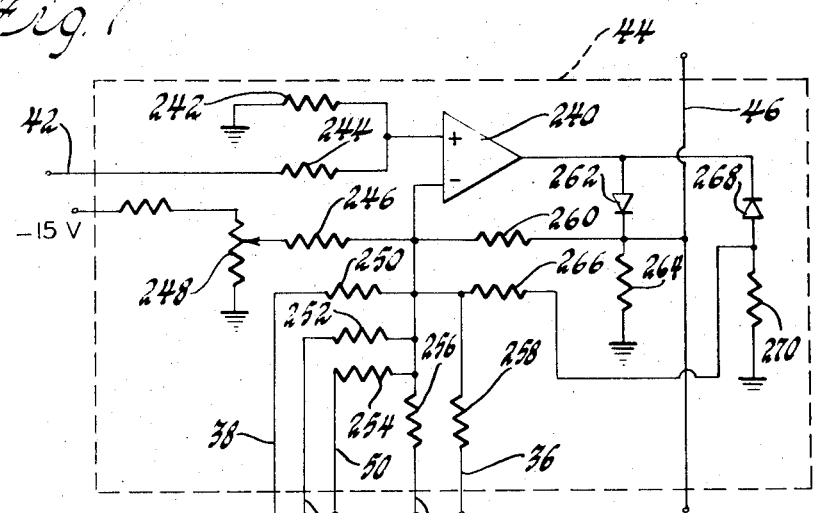
FIG. 9 is a schematic diagram of the summing circuit of FIG. 1.

A summing circuit 44 as shown in FIG. 9 includes an operational amplifier 240 having its positive input connected through resistors 242 and 244 to ground and line 42 respectively and its negative input connected through input resistor 246 to a potentiometer 248 which is connected between −15v and ground to provide a signal equivalent to $-(K_1 + K_0)$. The negative input is also connected through resistors 250, 252, 254, 256 and 258 which are connected to lines 38, 24, 50, 28 and 36 respectively. The negative terminal is connected through a first feedback resistor 260 and a diode 262 to the amplifier output and the junction point of the diode and the feedback resistor is connected to the output line 46, and is also connected through a resistor 264 to ground. The negative input is further connected to a second feedback resistor 266 and a diode 268 to the amplifier output and the junction of the diode 268 and the feedback resistor 266 is connected through a resistor 270 to ground. Since the positive input of the amplifier has as its input the $K_3$ term from the integrator and the negative input terminal has as input signals $-K_1$, $-K_0$, $-N_aL$, $-N_a$, $N_f$ and $-L$, the output signal on line 46 will be the signal corresponding to the pressure $P_c + K_0$. Further, when a signal is present on line 50 from the 30 rpm switch, the output signal will be accordingly reduced.

Figure 10:
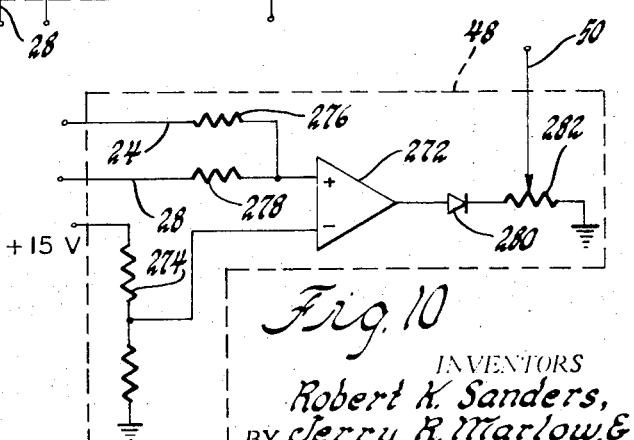
FIG. 10 is a schematic diagram of the 30 rpm switch of FIG. 1.

The 30 rpm switch 48 is shown in FIG. 10 and comprises an operational amplifier 272 connected as a trigger circuit having its negative input connected to a voltage divider 274 which is connected between +15v and ground. The positive input is connected through resistors 276 and 278 to lines 24 and 28 which carry the signals $-N_a$ and $N_f$ respectively. The output of the amplifier is connected through a diode 280 and a potentiometer 282 to ground, the slide tap of the potentiometer being connected to the output line 50. Normally, the amplifier output is negative and the diode 280 is backbiased so that the line 50 is at ground potential. When, however, signal $N_f$ exceeds $N_a$ by an amount equivalent to 30 rpm, the circuit will trigger to provide a positive output which is applied to line 50.

Figure 11:
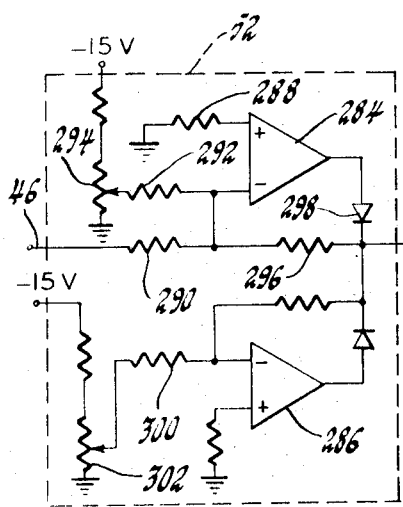
FIG. 11 is a schematic diagram of the non-controlling clutch computer of FIG. 1.

The non-controlling clutch computer 52 is shown in FIG. 11 and includes a pair of operational amplifiers 284 and 286 connected as unity gain inverting amplifiers. The amplifier 284 has its positive input grounded through resistor 288 and its negative input is connected through resistors 290 and 292 to line 46 carrying the signal $P + K_0$ and to a potentiometer 294 connected between −15v and ground. The negative terminal is also connected through a feedback resistor 296 and a diode 298 to the amplifier output. The output line 54 is connected at the junction of the diode and the feedback resistor. The voltage from the potentiometer is selected such that when the voltage $P_c + K_0$ on line 46 is zero ($P_c = -K_0$) the amplifier output is sufficient to cause fully apply clutch pressure, and when the voltage on line 46 is $K_0$ ($P_c = 0$) the output line will have a signal corresponding to $K_0 + 10$ psi. Thus during a skid condition when the signal $P_c$ becomes negative, the outside steer clutch will be energized to correct the skid. The amplifier 286 is connected in the same manner as the amplifier 284 except that the negative input is connected through a resistor 300 to a potentiometer 302 providing a signal equivalent to $-(10 \text{ psi} + K_0)$. The output line 54 will then carry a signal corresponding to 10 psi $+ K_0$ or 10 psi $-P_c + K_0$, whichever is larger.

It will thus be seen that the control circuit described herein provides a means for sensing track speeds and steer lever position so that for a given lever position, the appropriate steer clutch will be supplied with a pressure such that the actual track speed differential will correspond to the turning rate requested by the steer lever position, and that during a skid condition the opposite clutch will be pressurized to correct the skid.

The embodiment of the invention described herein is for purposes of illustration and the scope of the invention is intended to be limited only by the following claims:

It is claimed:

1. A closed loop steer control for a track laying vehicle for controlling track speed differential as a function of relative track speeds comprising
   a pair of variable torque capacity torque transmitting devices each actuable for effecting steering by positively controlling track speed differential,
   steer selector means for selecting the desired degree and direction of steering,
   means for sensing the track speeds, and
   means responsive to the sensing means and the steer selecting means for simultaneously regulating the torque capacity of the devices as a function of the track speeds for establishing a track speed differential consistent with the desired degree and direction of steering.

2. A closed loop steer control for a track laying vehicle for controlling track speed differential as a function of relative track speeds comprising
   a pair of pressure responsive torque transmitting devices having torque capacities varying with pressure, and simultaneously actuable for effecting steering by positively controlling track speed differential,
   manually operated steer selecting means for selecting the desired degree and direction of steering,
   means for sensing the track speeds, and
   pressure controlling means responsive to the sensing means and the steer selecting means for simultaneously regulating the pressures on the devices as a function of the track speeds for establishing a track speed differential consistent with the desired degree and direction of steering.

3. A closed loop steer control for a track laying vehicle for controlling track speed differential as a function of relative track speeds comprising
   a pair of variable torque capacity torque transmitting devices each actuable for effecting steering by positively controlling track speed differential, means associated with each device responsive to an electrical control signal for varying the torque capacity of each device, manually controlled electrical selector means for selecting the desired degree and direction of steering, electrical means for sensing the track speeds, and an electronic controller responsive to the sensing means and the steer selecting means for producing the electrical control signal and applying the signal to the signal responsive means to actuate their respective devices and for simultaneously regulating the torque capacity of the devices as a function of the track speeds for establishing a track speed differential consistent with the desired degree and direction of steering.

4. A closed loop steer control for a track laying vehicle for controlling track speed differential as a function of relative track speeds comprising a pair of variable torque capacity torque transmitting devices each actuable for effecting a track speed differential, pressure responsive means associated with each device regulated by an electrical control signal for varying the torque capacity of each device, manually controlled electrical selector means for selecting the desired degree and direction of steering, electrical means for sensing the track speeds, and an electronic controller responsive to the sensing means and the steer selecting means for producing the electrical control signal and applying the signal to one of the pressure responsive means to actuate its respective device for primarily regulating the pressure on said respective device as a function of the track speeds for establishing a track speed differential consistent with the desired degree and direction of steering, and including means for applying a signal to the other of the pressure responsive means for regulating the other of the devices at a low pressure to hold it in readiness for actuation for a reversal of track speed differential.

5. A closed loop steer control for a track laying vehicle for controlling track speed differential as a function of relative track speeds comprising a pair of selectively engageable variable torque capacity torque transmitting devices, pressure responsive means for simultaneously regulating the devices for effecting steering in one direction, electronic control means regulating the pressure responsive means for establishing a track speed differential according to a desired vehicle turning rate, the control means including manually controlled electrical selector means for selecting the direction of steering and the desired turning rate, electrical means for sensing the track speeds, means effective during an initial steering phase for effecting pressures on the regulated devices for causing a track speed differential, and means for modulating the pressure on each device according to the difference between the desired turning rate and the actual turning rate to regulate the track speed differential to that required to achieve the desired turning rate.

* * * * *